March 16, 1943.   H. L. SMITH ET AL   2,313,899
DYNAMOELECTRIC MACHINE
Filed Aug. 1, 1941    2 Sheets-Sheet 2

Inventors
Harold L. Smith
Frank J. Rathbun

Patented Mar. 16, 1943

2,313,899

UNITED STATES PATENT OFFICE 2,313,899

DYNAMOELECTRIC MACHINE

Harold L. Smith and Frank J. Rathbun, Milwaukee, Wis., assignors to The Louis Allis Company, Milwaukee, Wis., a corporation of Wisconsin Application August 1, 1941, Serial No. 405,006

2 Claims. (Cl. 171—252)

This invention relates to dynamoelectric machines and has as an object the provision of a novel fabricated frame especially suitable for motors and by which the overall weight of the machine is materially reduced and a strong inexpensive structure obtained.

Another object of this invention is to provide a frame for dynamoelectric machines so designed that its assembly produces an open bottomed air passage embracing the stator of the machine.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

Figure 1:
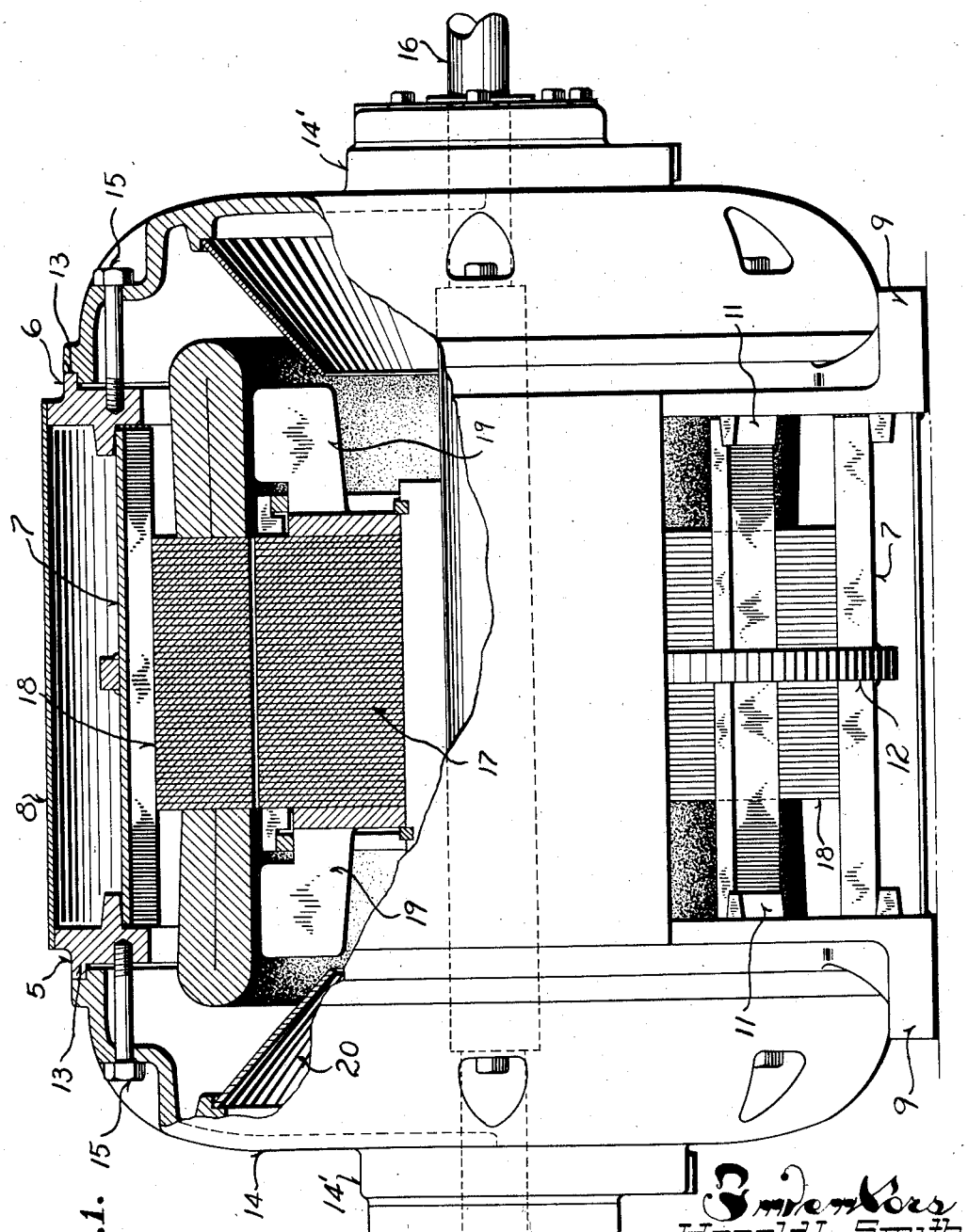
Figure 2:
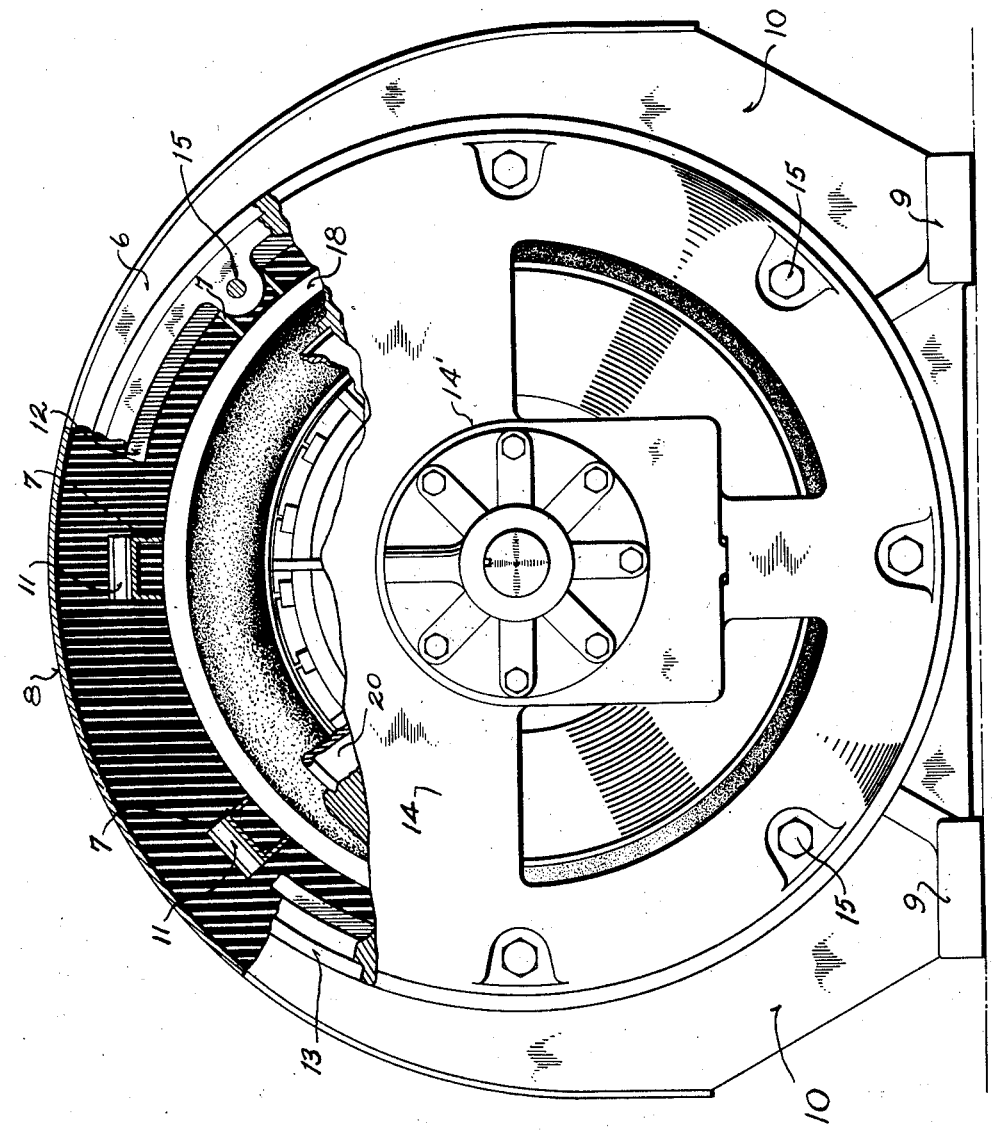

The accompanying drawings illustrate one complete example of the physical embodiment of the invention constructed in accordance with the best mode so far devised for the practical application of the principles thereof, and in which:

Figure 1 is a view partly in side elevation and partly broken away and in section showing a dynamoelectric machine embodying this invention; and Figure 2 is a view partly in end elevation and partly broken away and in section.

Referring now particularly to the accompanying drawings, in which like numerals indicate like parts, the numerals 5 and 6 designate two similar but opposite end rings. These end rings may be cast and together with a plurality of longitudinal tie members 7 and an outer hoodlike shell 8 constitute the frame of the machine. Each of the end rings has feet 9 formed thereon and each ring has a radial outwardly extending flat web 10 which connects with the feet and embraces the ring.

The top and side edges of the webs 10 are substantially semi-circular and have the ends of the hood-like shell 8 welded thereto. The hood-like shell thus embraces the tie members in spaced relation thereto.

The longitudinal tie members 7 are channel shaped in cross section and like the shell 8 are welded to the rings. To facilitate the attachment of the tie members to the rings, lugs 11 project from the inner faces of the rings to support the channel tie members and to which they are secured.

Added reinforcement is provided for the frame by a ring 12 which encircles the channel tie members substantially midway between the end rings, and is welded thereto.

On the outer face of each end ring is an annular locating flange 13. These locating flanges and the inner edges of the tie members are concentrically bored. Brackets or end bells 14 are attached to the end rings by bolts 15 being properly centered or located by the flanges 13, and each bracket carries a bearing housing 14' supporting a bearing (not shown) in which the shaft 16 of the rotor 17 is journalled.

The stator 18 is mounted in the frame by having its laminations fastened to the longitudinal tie members, coaxiality between the stator and rotor being assured by the concentricity of the annular locating flanges 13 and the inner edges of the channel tie members.

By virtue of the channel shaped cross section of the tie members maximum clearance is afforded around the entire stator laminations to facilitate the dissipation of heat and it is to be observed that the coils of the stator are spaced from the bores of the end rings. Hence, air currents may flow around the ends of the stator coils and through the end rings to flow over the stator laminations. Such currents are induced by impellers 19 on the opposite ends of the rotor to revolve inside the ends of the stator coils.

Funnel-like induction tubes 20 on the end bells or brackets guide the incoming air to the center of the impellers and then guide the air discharged from the impellers out around the ends of the stator coils for passage into the space defined between the stator and the outer hood-like shell to be discharged from this space at its open bottom.

From the foregoing description, taken in connection with the accompanying drawings, it will be readily apparent to those skilled in the art that this invention provides an exceedingly simple but efficient manner of fabricating the frame of a dynamoelectric machine and that by virtue of the specific construction employed, a light, strong structure is obtained which is considerably less expensive than the cast frames heretofore in use.

What we claim as our invention is:

1. In a dynamoelectric machine having a stator and a rotor journalled in bearings carried by spaced end brackets for rotation within the stator: a fabricated frame for the machine comprising, two endwise spaced cast rings to which the end brackets are securable; feet for the machine cast integrally with said rings near the bottom thereof; a substantially planar flange projecting radially outwardly from each ring and joined to the feet thereof, said flanges being substantially semi-circular in shape with their lower portions extending radially out beyond the feet of the rings; a sheet metal hood extending between said flanges and secured to the edges thereof, said hood terminating a substantial distance short of the connection between the flanges and the feet so as to provide a large port through which air for cooling the interior of the machine circulates; a plurality of structural channel-shaped tie members extending between the rings in spaced relationship with the hood and having their ends welded to the rings, the flanges of said tie members facing toward the center of the machine; and an annular flange on the outer face of each of said rings, said annular flange having a surface accurately machined so as to properly locate the end brackets of the machine, and the flanges of the tie members being bored concentrically with said machined surfaces of the annular flanges so as to accurately receive and locate the stator of the machine and to thereby insure coaxiality between the stator and rotor.

2. In a dynamoelectric machine having a stator and a rotor journalled in bearings carried by spaced end brackets for rotation within the stator: a fabricated frame for the machine comprising, two endwise spaced cast rings to which the end brackets are securable; feet for the machine cast integrally with said rings near the bottom thereof; a hood-like outer shell secured over the top and sides of the rings to join the same, said hood having its ends terminating short of the feet on said rings to provide a large port through which air for cooling the interior of the machine circulates; a plurality of structural channel-shaped tie members extending between the rings in spaced relationship with the hood-like outer shell and having their ends welded to the rings whereby said tie members cooperate with the hood-like outer shell to rigidly connect the rings in axial alignment, the flanges of said tie members facing toward the center of the machine; and an annular flange on the outer face of each of said rings, said annular flange having a surface accurately machined so as to properly locate the end brackets of the machine, and the flanges of the tie members being bored concentrically with said machined surfaces of the annular flanges so as to accurately receive and locate the stator of the machine and to thereby insure coaxiality between the stator and rotor.

HAROLD L. SMITH.
FRANK J. RATHBUN.